United States Patent
Sano et al.

(10) Patent No.: US 7,980,219 B2
(45) Date of Patent: Jul. 19, 2011

(54) INTAKE CONTROLLER FOR INTERNAL COMBUSTION ENGINE

(75) Inventors: Ryo Sano, Kariya (JP); Katsuya Torii, Anjo (JP)

(73) Assignee: Denso Corporation, Kariya (JP)

( * ) Notice: Subject to any disclaimer, the term of this patent is extended or adjusted under 35 U.S.C. 154(b) by 479 days.

(21) Appl. No.: 12/166,772

(22) Filed: Jul. 2, 2008

(65) Prior Publication Data

US 2009/0007875 A1     Jan. 8, 2009

(30) Foreign Application Priority Data

Jul. 6, 2007   (JP) ................................ 2007-178801

(51) Int. Cl.
*F02D 9/10*     (2006.01)
(52) U.S. Cl. ................... 123/336; 123/184.53; 123/337; 123/442; 251/214
(58) Field of Classification Search .................. 123/336, 123/337, 319, 442, 432, 308, 306, 301, 376, 123/399, 184.21, 184.27, 184.38, 184.61; 251/214, 307, 308, 305
See application file for complete search history.

(56) References Cited

U.S. PATENT DOCUMENTS

| | | | |
|---|---|---|---|
| 4,961,355 A | | 10/1990 | Irino et al. |
| 5,092,296 A | * | 3/1992 | Gunter et al. ................. 123/337 |
| 5,168,951 A | * | 12/1992 | Sugiura et al. ................. 180/197 |
| 5,522,361 A | * | 6/1996 | Pickman et al. .............. 123/336 |
| 6,779,389 B2 | | 8/2004 | Kubota et al. |
| 7,019,516 B2 | | 3/2006 | Tokunaga et al. |
| 2003/0178004 A1 | * | 9/2003 | Keefover et al. .............. 123/399 |

FOREIGN PATENT DOCUMENTS

| | | |
|---|---|---|
| GB | 2 393 218 | 3/2004 |
| JP | 64-15511 | 1/1989 |
| JP | 2002-317718 | 10/2002 |
| JP | 2007-068378 | 3/2007 |

OTHER PUBLICATIONS

Japanese Office Action dated Apr. 14, 2009, issued in corresponding Japanese Application No. 2007-178801, with English translation.

* cited by examiner

*Primary Examiner* — Michael Cuff
*Assistant Examiner* — Hung Q Nguyen
(74) *Attorney, Agent, or Firm* — Nixon & Vanderhye PC

(57) ABSTRACT

An intake controller includes a casing defining an intake passage that communicates with a combustion chamber of an engine, a valve received in the casing to open/close the passage, a rotational shaft that changes an opening degree of the valve, an actuator having a gear that drives the valve through the shaft, a gear retaining member retaining the gear, a sensor including a magnet that rotates according to rotation of the shaft and a magnetic detection element that detects magnetic flux generated from the magnet, and a sensor retaining member retaining the sensor. The sensor detects the opening degree of the valve based on a change of density of the magnetic flux passing through the element. One of the gear and the gear retaining member, and one of the sensor and the sensor retaining member are separately fixed on the shaft.

15 Claims, 11 Drawing Sheets

US 7,980,219 B2

INTAKE CONTROLLER FOR INTERNAL COMBUSTION ENGINE

CROSS REFERENCE TO RELATED APPLICATION

This application is based on Japanese Patent Application No. 2007-178801 filed on Jul. 6, 2007, the disclosure of which is incorporated herein by reference.

BACKGROUND OF THE INVENTION

1. Field of the Invention

The present invention relates to an intake controller for an internal combustion engine. In particular the present invention relates to an intake controller provided with an intake vortex generating device which throttles a cross sectional area of an intake passage communicating with a combustion chamber of the engine to generate an intake vortex in the combustion chamber of the engine.

2. Description of Related Art

There is conventionally known a throttle controller for an internal combustion engine which controls a flow quantity of intake air aspired into an internal combustion engine for an automobile or the like, as an intake controller for the internal combustion engine. The throttle controller is, as shown in FIGS. 7 to 9, provided with a throttle body 101 united with an intake pipe for the internal combustion engine and a throttle valve 104 for opening/closing a throttle bore 103 as an intake passage of a throttle bore wall 102 as a casing of the throttle body 101. Further, the throttle body 101 is provided with an actuator such as an electronic motor 106 for driving a shaft 105 as a rotational shaft of the throttle valve 104. The actuator includes the electric motor 106, a gear reduction mechanism (including a pinion gear 111, an intermediate reduction gear 112 and a final reduction gear 113), a sensor cover 107 and the like.

A throttle position sensor is mounted in the actuator for detecting a throttle position corresponding to a valve position of the throttle valve 104. The throttle position sensor is formed of a magnet 121 retained and fixed in the final reduction gear 113, a magnetic detection element of a non-contact type (not shown) retained and fixed in a sensor mounting portion 122 of the sensor cover 107 as facing the magnet 121, and the like. Here, a metallic gear fixing plate 114 is insert-molded in an inner peripheral portion of the plastic final reduction gear 113. In the throttle controller, in general for preventing a relative rotation between the shaft 105, the final reduction gear 113 and the gear fixing plate 114, a fitting portion 123 provided at an end in a rotational shaft direction of the shaft 105 is formed in an elliptic shape as having a width across flat portion 124 and a fitting bore 125 formed inside the gear fixing plate 114 is formed in an elliptic shape as having a width across flat portion 126. Therefore, an elliptic portion 127 of the gear fixing plate 114 is fitted on an outer periphery of the fitting portion 123 of the shaft 105 in such a manner as not to move in the circumferential direction of the shaft 105. On an outer peripheral portion of the final reduction gear 113, a fully closed stopper portion 130 contacting a fully closed stopper 129 when the throttle valve 104 is fully closed and a circular gear portion (formed of many teeth) 131 meshing with the intermediate reduction gear 112 are integrally formed.

As the intake controller for the internal combustion engine, there is, as shown in FIG. 10, known an intake passage opening/closing device for an internal combustion engine which is provided with a housing 141 united with an intake pipe, an intake flow control valve 142 opening/closing an intake passage of the internal combustion engine, a shaft 143 supporting and fixing the intake flow control valve 142 and an actuator driving the intake flow control valve 142 through the shaft 143 (for example, refer to JP2004-028809A and JP2007-68378A). The actuator is formed of an electric motor 144, a worm gear 145, a helical gear 146, a flexible member 147, an output spur gear 151, an input spur gear 152 and the like. Further, a valve position sensor of a non-contact type is mounted in the actuator for detecting a valve position of the intake flow control valve 142. The valve position sensor is formed of a magnet 153 retained and fixed in the input spur gear 152 and a pair of yokes (magnetic body) arranged as opposed to the magnet 153 and magnetized by a magnetic force of the magnet 153, a hole IC 154 arranged in a magnet detection gap formed between the opposing yokes and the like. A fully opened stopper 155 is provided to be capable of contacting the input spur gear 152.

Further, as shown in FIG. 11, there is known an intake controller for an internal combustion engine using a shaft 162 having a vertical cross section in the rotational shaft direction formed in a polygonal shape, as a rotational shaft (drive shaft) for transmitting a driving force of the electric motor 161 to an intake flow control valve (for example, refer to JP2004-124933A). This intake controller is provided with a final reduction gear 164 having a cylindrical portion for rotatably supporting an end in an axial direction of the shaft 162 by a bearing portion 163 in the side of the intake manifold. An insert bore 166 in a blind bore-shape is formed inside a cylindrical portion 165 of the final reduction gear 164. An end of the shaft 162 is inserted in the insert bore 166 which is formed with substantially the same cross section as that of the shaft 162. In consequence, inserting the shaft 162 into the insert bore 166 causes a relative rotation between the shaft 162 and the final reduction gear 164 to be restricted However, in the throttle controller for the internal combustion engine shown in FIGS. 7 to 9 and in the intake passage opening/closing device for the internal combustion engine described in JP2004-028809A and JP2007-68378A, the final reduction gear 113 or the input spur gear 152 and the magnet 121 or 153 are arranged in the gear fixing plate 114 or the input spur gear body fixed to the shaft 105 or 143. Therefore, even if a rotational slip occurs between the final reduction gear 113 or the input spur gear 152 arranged in the gear fixing plate 114 or the input spur gear body and the shaft 105 or 143, a relative position between the final reduction gear 113 or the input spur gear 152 and the magnet 121 or 153 does not change. In consequence, the magnetic detection element or the hole IC 154 can not detect an abnormal state such as a rotational slip between the final reduction gear 113 or the input spur gear 152 and the shaft 105 or the shaft 143. In addition, in the intake controller for the internal combustion engine described in JP2004-124933A, since the final reduction gear 164 having the insert bore in a blind bore shape is mounted in a tip portion in the rotational shaft direction of the shaft 162, a sensor component (for example, magnet) required to be fixed separately from the final reduction gear 164 can not be mounted to the shaft 162.

SUMMARY OF THE INVENTION

The present invention is made in view of the foregoing problems and an object of the present invention is to provide an intake controller for an internal combustion engine, which detects an abnormal state such as a rotational slip between a rotational shaft and the gear using the sensor by separately arranging a gear or a gear retaining member and a sensor or a sensor retaining member.

To achieve the object of the present invention, there is provided an intake controller for an internal combustion engine. The intake controller includes a casing, a valve, a rotational shaft, an actuator, a gear retaining member, a sensor including a magnet and a magnetic detection element, and a sensor retaining member. The casing defines an intake passage, which communicates with a combustion chamber of the engine. The valve is received in the casing to open and close the intake passage. The rotational shaft is configured to change a degree of opening of the valve. The actuator has a gear, which is disposed to drive the valve through the rotational shaft. The gear retaining member is arranged to retain the gear. The magnet is disposed to rotate in accordance with rotation of the rotational shaft. The magnetic detection element is configured to detect a magnetic flux generated from the magnet. The sensor is configured to detect the degree of opening of the valve based on a change of a density of the magnetic flux passing through the magnetic detection element. The sensor retaining member is arranged to retain the sensor. One of the gear and the gear retaining member, and one of the sensor and the sensor retaining member are separately fixed on the rotational shaft

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Hereinafter, embodiments of the present invention will be explained with reference to the drawings.

First Embodiment (Construction of First Embodiment)

A first embodiment of the present invention will be explained with reference to FIGS. 1 to 5C.

Figure 1:
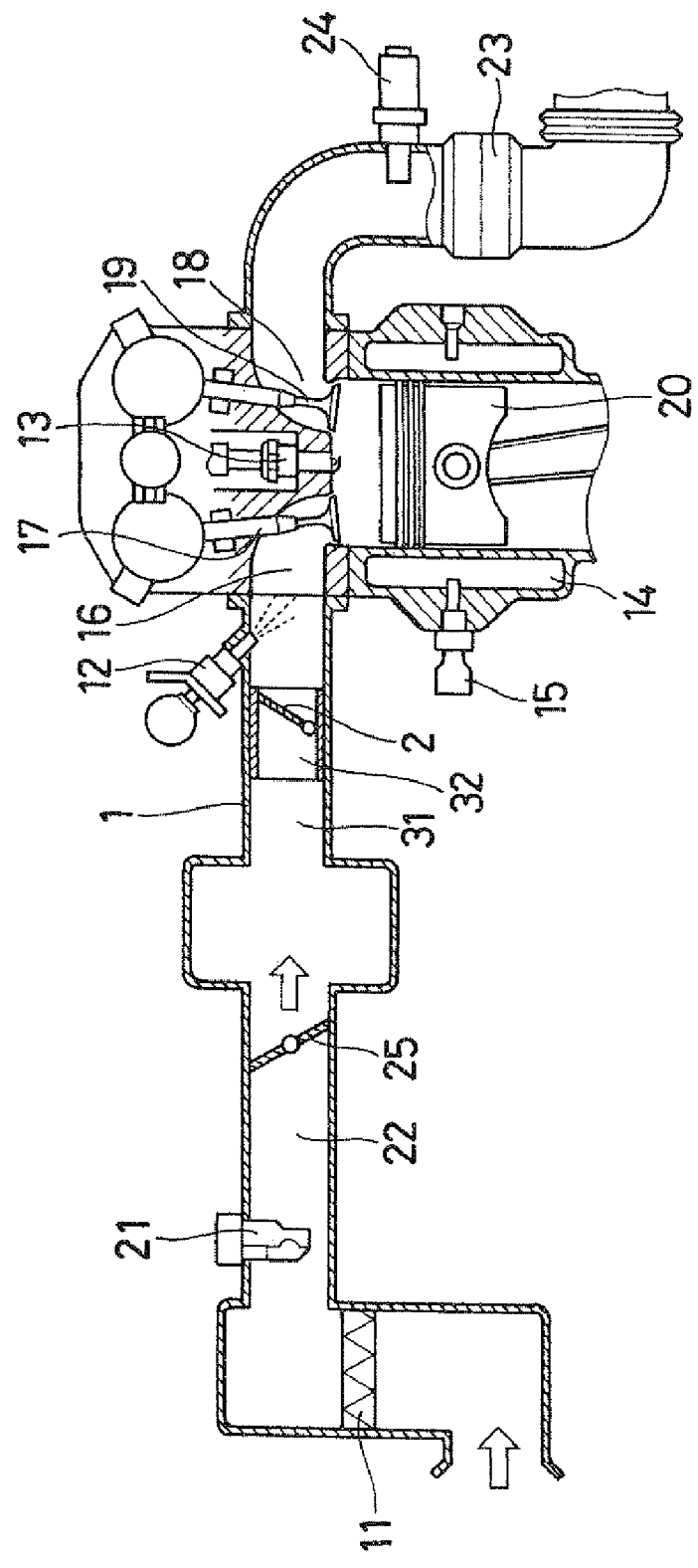
FIG. 1 is a schematic diagram showing an intake controller for an internal combustion engine according to a first embodiment of the present invention.

An intake controller for an internal combustion engine in the present embodiment shown in FIG.1 is used as an intake passage opening/closing device for opening/closing an intake passage supplying intake air (intake) to a combustion chamber of each cylinder for a multi-cylinder internal combustion engine (for example, a four-cylinder engine: hereinafter, referred to as "engine") mounted in an engine room in a vehicle such as an automobile. The intake controller acting as the intake passage opening/closing device for the internal combustion engine is provided with a throttle controller (throttle controller for an internal combustion engine) controlling a flow quantity of intake air (intake air quantity) suctioned into the combustion chamber of each cylinder in the engine and an intake vortex generating device generating an intake vortex for promoting combustion of a mixture in the combustion chamber of each cylinder in the engine. The intake vortex generating device is incorporated in an intake system of the engine together with the throttle controller. The intake vortex generating device is an intake passage opening/closing device (valve opening/closing device) of an integrated multiple type in which a plurality of valve units are arranged in parallel with each other at constant intervals in an axial direction (rotational shaft direction) of a pin rod (rotational shaft or shaft) 3 inside (fitting hole) an intake manifold 1.

Here, the engine is a water cooling type of gasoline engine for producing output by a thermal energy acquired by burning a mixture of clean intake air filtered in a filter element 11 of an air cleaner and fuel injected from an injector (electromagnetic fuel injection valve) 12. The engine adopts a four-cycle engine in which four strokes of an intake stroke, a compression stroke, an expansion (combustion) stroke and an exhaust stroke are repeated periodically. The engine is provided with an intake pipe for introducing intake air into the combustion chamber in each cylinder of the engine and an exhaust pipe for discharging an exhaust gas flowing out from the combustion chamber in each cylinder of the engine to an outside.

The engine is formed of a cylinder head connected airtightly to a lower end of the intake manifold 1, a cylinder block forming the combustion chamber between the cylinder head and the cylinder block, and the like. The cylinder head is provided with an injector 12 for injecting fuel into an intake port of each cylinder in the engine at an optimal timing. A spark plug 13 is attached at the downstream portion of the intake manifold 1 (or cylinder head) so that a tip portion thereof is exposed to the combustion chamber of each cylinder. A cooling water temperature sensor 15 is mounted in the cylinder block for detecting a temperature of an engine cooling water (cooling water temperature) cyclically supplied to a water jacket of the engine.

Each of a plurality of intake ports 16 formed in one side of the cylinder head is opened/closed by a poppet type of intake valve 17. Each of a plurality of exhaust ports 18 formed in the other side of the cylinder head is opened/closed by a poppet type of exhaust valve 19. A piston 20 connected through a connecting rod to a crank shaft is slidably supported in a cylinder bore formed inside the cylinder block.

The intake pipe of the engine is a casing (intake duct or intake introduction duct) in which the intake passage is formed for supplying intake air to the combustion chamber of each cylinder in the engine. The intake pipe of the present embodiment is provided with an air flow meter 21 for detecting an intake air quantity suctioned into the combustion chamber of each cylinder in the engine. Further, one common intake passage (intake passage of the engine) 22 communicated with the combustion chamber of each cylinder in the engine is formed inside the intake pipe on an upstream side of the intake manifold 1 in the intake flow direction. The exhaust pipe of the engine is a casing (exhaust duct or exhaust discharge duct) in which the exhaust passage is formed for discharging an exhaust gas flowing out from the combustion chamber of each cylinder in the engine via an exhaust gas purifying device 23 to an outside. In the present embodiment, for example, a catalyst such as a three-way catalyst for purifying CO, HC, NOx and the like in the exhaust gas is adopted as the exhaust gas purifying device 23. The exhaust pipe of the present embodiment is provided with an exhaust gas sensor (air-fuel ratio sensor or oxygen sensor) 24 for detecting a state of an exhaust gas (air-fuel ratio or the like) flowing out from the combustion chamber of each cylinder in the engine.

Here, the throttle controller of the present embodiment is a system for varying an intake air quantity suctioned into the combustion chamber of each cylinder in the engine in accordance with a throttle position corresponding to a valve position of a throttle valve 25. The throttle controller is formed of a throttle body arranged in the midst of the intake pipe of the engine, a butterfly type of throttle valve 25 varying an intake air quantity flowing inside the intake pipe (common intake passage 22), a return spring (or default spring) urging the throttle valve 25 in the valve-closing operation direction (or in the valve-opening operation direction) and the like. The throttle body is provided with an actuator having an electric motor for driving a shaft supporting and fixing the throttle valve 25 in the valve-opening operation direction (or in the valve-closing operation direction). Here, the electronic motor for driving the throttle valve 25 is configured to electrically be controlled by an engine control unit (engine control unit: hereinafter, referred to as "ECU").

Here, the intake vortex generating device of the present embodiment is arranged in an engine room in a vehicle such as an automobile in the same way as the engine is arranged. The intake vortex generating device is a system which throttles each passage cross sectional area of a plurality of first and second intake passages 31 and 32 communicated with the combustion chamber of each cylinder in the engine to generate a longitudinal intake vortex (tumble flow) in the combustion chamber of each cylinder in the engine. The intake vortex generating device is provided with the intake manifold 1 connected to the intake pipe of the engine on a downstream side of the throttle body and the surge tank in the intake flow direction, a plurality of intake flow control valves (tumble control valve and valve unit: hereinafter, referred to as "TCV") which control intake air flowing in an inside (a plurality of first and second intake passages 31 and 32) of the intake manifold 1 to generate a tumble flow in the combustion chamber, a pin rod 3 press-fitted into an inside (valve shaft 26) of the intake flow control valve 2 as a valve body of the TCV, one actuator which can change valve positions of the plurality of the TCVs at a time through the pin rod 3 and the ECU for controlling each valve position of the plurality of intake flow control valves 2 in association with each system such as the throttle controller, an ignition device and a fuel injection device.

The intake manifold 1 of the present embodiment is a casing which forms the plurality of the first intake passages (branch intake passage) 31 communicated with the combustion chamber of each cylinder in the engine. The first intake passages 31 having a square section and housing storage chambers 33 having a square section are respectively formed inside the intake manifold 1 by the number corresponding to that of the cylinders. Each first intake passage 31 is connected to each intake port 16 of the cylinder head separately from each other. The valve unit, particularly the housing 35 is fitted and retained inside each housing storage chamber 33.

A shaft through bore 34 penetrating through all of the housing storage chambers 33 is formed in the intake manifold 1. The intake manifold 1 has a plurality of polygonal tubular portions 36 provided to surround the circumference of each housing 35 to form the first intake passage 31 and the housing storage chamber 33 inside. Each polygonal tubular portion 36 of the intake manifold 1 constitutes a polygonal tubular portion outside the intake manifold having a double-pipe structure and has a joint surface air-tightly connected to a joint surface of the cylinder head in the engine. Further, a cylindrical shaft bearing portion 37 rotatably supporting one end (sliding surface) of the pin rod 3 in the rotational shaft direction is formed in the intake manifold 1. A cylindrical shaft bearing portion 39 rotatably supporting a cylindrical surface (sliding surface) of the joint 4 is formed in the intake manifold 1.

Each of the plurality of the TCVs is constructed of the housing 35 stored in the housing storage chamber 33 of the intake manifold 1, the intake flow control valve 2 arranged inside the housing 35 (second intake passage 32) in such a manner as to be capable of opening and closing, and the like. In the present embodiment, the housing 35 and the intake flow control valve 2 constitute the valve unit (cartridge) fitted and retained in the housing storage chamber 33 of the intake manifold 1. In addition, the intake manifold 1, the plurality of the housings 35 and the plurality of the intake flow control valves 2 are formed integrally by a resin material.

Here, the plurality of the valve units include the plurality of the second intake passages 32, each being connected to a corresponding first intake passage 31 of the intake manifold 1 and to a corresponding intake port 16 of the cylinder head, for each of the plurality of the housings 35. That is, the second intake passage 32 having a square section is formed inside each housing 35. Each of the second intake passages 32 is arranged on a downstream side of each first intake passage 31 of the intake manifold 1 in the intake flow direction and is connected through each of the plurality of the intake ports 16 to the combustion chamber of each cylinder in the engine separately from each other. Each intake flow control valve 2 is accommodated in each housing 35 in such a manner as to open and close. Two valve bearing portions rotatably supporting both ends of each intake flow control valve 2 in the rotational shaft direction (two sliding portions of the valve shaft 26) through a bearing 40 are formed in the housing 35.

Each of the plurality of the intake flow control valves 2 is a rotary valve which has a rotational center axis in a direction orthogonal to the axis direction (intake flow direction) of each housing 35 and is connected to one pin rod 3 in a skewer state. In the intake flow control valve 2, a rotational angle thereof (valve position) changes quantity flowing in each second intake passage 32 is maximized to a fully closed position where an intake air quantity flowing in each second intake passage 32 is minimized. In this way, the intake flow control valve 2 rotates relatively to each housing 35 to open/close each second intake passage 32. That is, a passage cross sectional area of each second intake passage 32 is throttled.

Figure 2A:
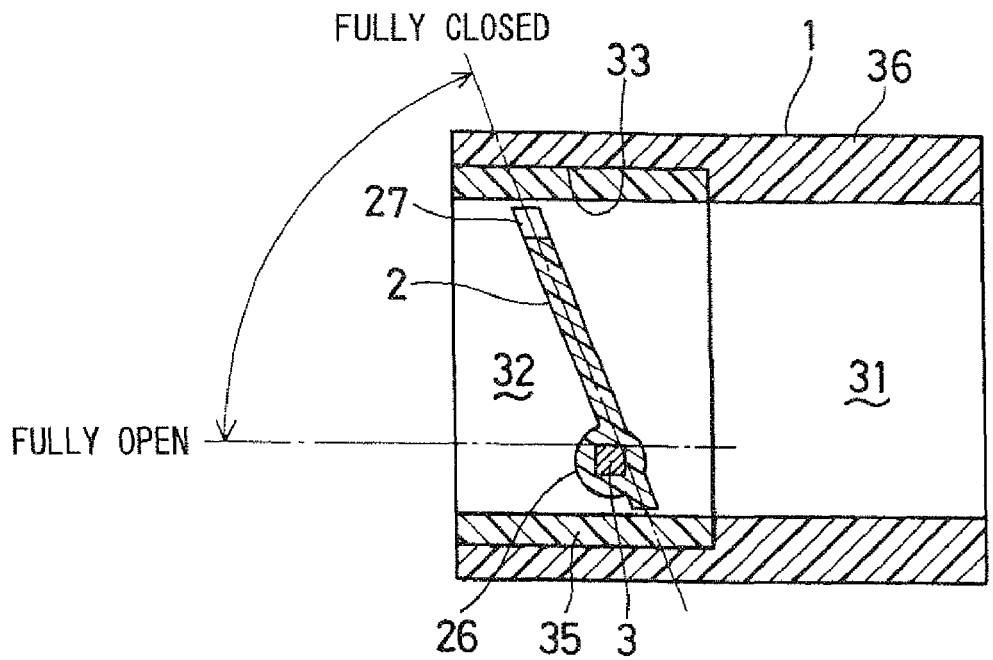
FIG. 2A is a cross-sectional view showing a fully closed position of an intake control valve according to the first embodiment.

Here, when the engine is in a cold state or the intake air quantity is permitted to be small, the plurality of the intake flow control valves 2 are, as shown in FIG. 2A, made to be fully closed by the actuator, particularly a driving force of the electric motor. That is, each valve position of the plurality of the TGVs is controlled to be in a fully closed opening (fully closed position). It should be noted that a fully closed position of the intake flow control valve 2 means a state of being in a fully closed opening degree where the intake flow control valve 2 is fully closed. In addition, the fully closed position is a limit position on the other side of a possible operation range of the intake flow control valve 2, that is, a fully closed-side regulation position where a fully closed stopper portion of a throttle lever 6 fitted and fixed on the outer periphery of the joint 4 contacts a fully closed stopper (not shown) to prevent the fully closed operation of the intake flow control valve 2 from being further made.

Figure 2B:
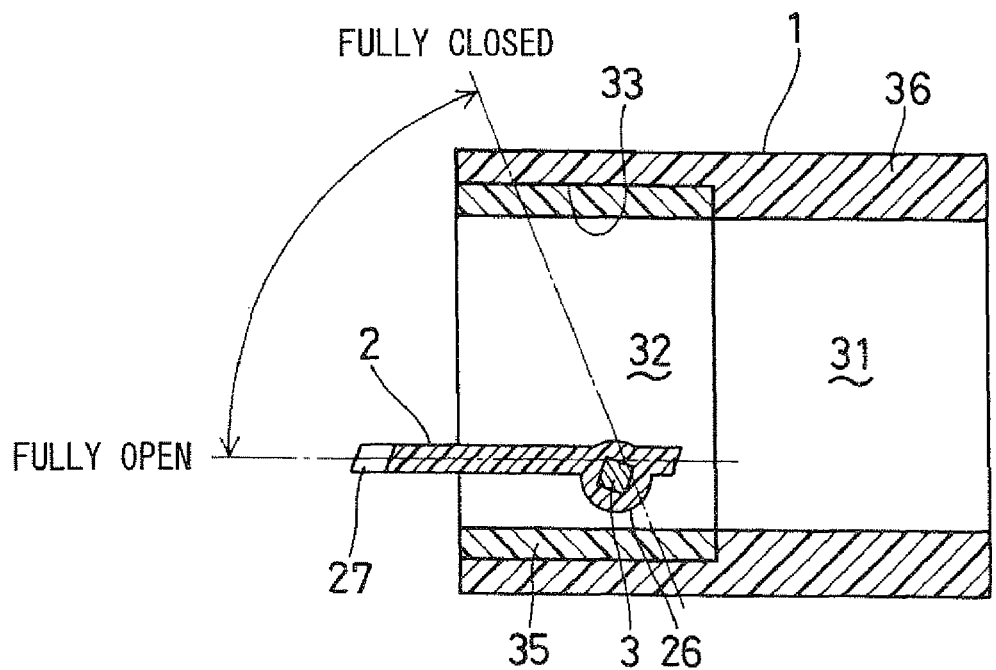
FIG. 2B is a cross-sectional view showing a fully opened position of the intake control valve according to the first embodiment.

The plurality of the intake flow control valves 2 are, as shown in FIG. 2B, made to be fully opened by the driving force of the electric motor at intermediate and high speed rotational regions or at intermediate and high load regions of the engine. That is, each valve position of the plurality of the TCVs is controlled to be in a fully opened state (fully opened position). It should be noted that the fully opened position of the intake flow control valve 2 means a state of being in a fully opened opening degree where the intake flow control valve 2 is fully opened. In addition, the fully opened position is a limit position on one side of the possible operation range of the intake flow control valve 2, that is, a fully opened-side regulation position where a fully opened stopper portion of the throttle lever 6 contacts a fully opened stopper (not shown) to prevent the fully opened operation of the intake flow control valve 2 from being further made. Further, when power supply to the electric motor is stopped at engine stopping, each of the plurality of the intake flow control valves 2 is returned back to the fully opened position (or state of an intermediate opening degree (intermediate position) which is closed more slightly than the fully opened position) by an urging force of a spring, for example.

Here, each of the plurality of the valve units has polygonal holes (square hole) penetrating in the rotational shaft direction of the pin rod 3 for each of the plurality of the intake flow control valves 2. In addition, the plurality of the intake flow control valves 2 have a cylindrical valve shaft 26 arranged to surround the circumference of the polygonal hole. Further, in the present embodiment, by cutting away a part (central portion) of a valve upper end surface of the intake flow control valve 2, that is, by cutting away the valve upper end surface at the opposite side to the valve shaft, a rectangular opening (notch portion or slit) 27 for generating an intake vortex (tumble flow) of the intake air supplied to the combustion chamber of each cylinder in the engine is formed. It should be noted that the opening 27 may not be provided. Further, by cutting away a part of each of the valve right and left side surfaces of the intake flow control valve 2, a sub-opening having an opening area smaller than that of the opening (primary opening) 27 may be formed.

Here, the pin rod 3 is inserted inside each polygonal hole formed for each of the plurality of the intake flow control valves 2 by press-fitting. The pin rod 3 makes the respective valve shafts 26 of the plurality of the intake flow control valves 2 be connected in a skewer shape and as a result, is one drive shaft which can connect all the intake flow control valves 2 so as to move together. The pin rod 3 is a rotational shaft for changing the valve position of the plurality of the intake flow control valves 2 and press-fitted and fixed on an inner periphery of each polygonal hole provided in each of the plurality of the intake flow control valves 2. Here, the cylindrical joint 4 is fitted and retained on an outer periphery of the other end side (actuator side) of the pin rod 3 in the present embodiment in the rotational shaft direction. The joint 4 is a shaft having a cylindrical section, which has a cylindrical cross section perpendicular to the rotational shaft direction and is formed integrally by a metallic material. The pin rod 3 in the present embodiment is a shaft having a polygonal section (angular steel shaft), which has a polygonal cross section (for example, square shape) perpendicular to the rotational shaft direction and is formed integrally by a metallic material. A detail of the pin rod 3 and the joint 4 will be described later.

Figure 3:
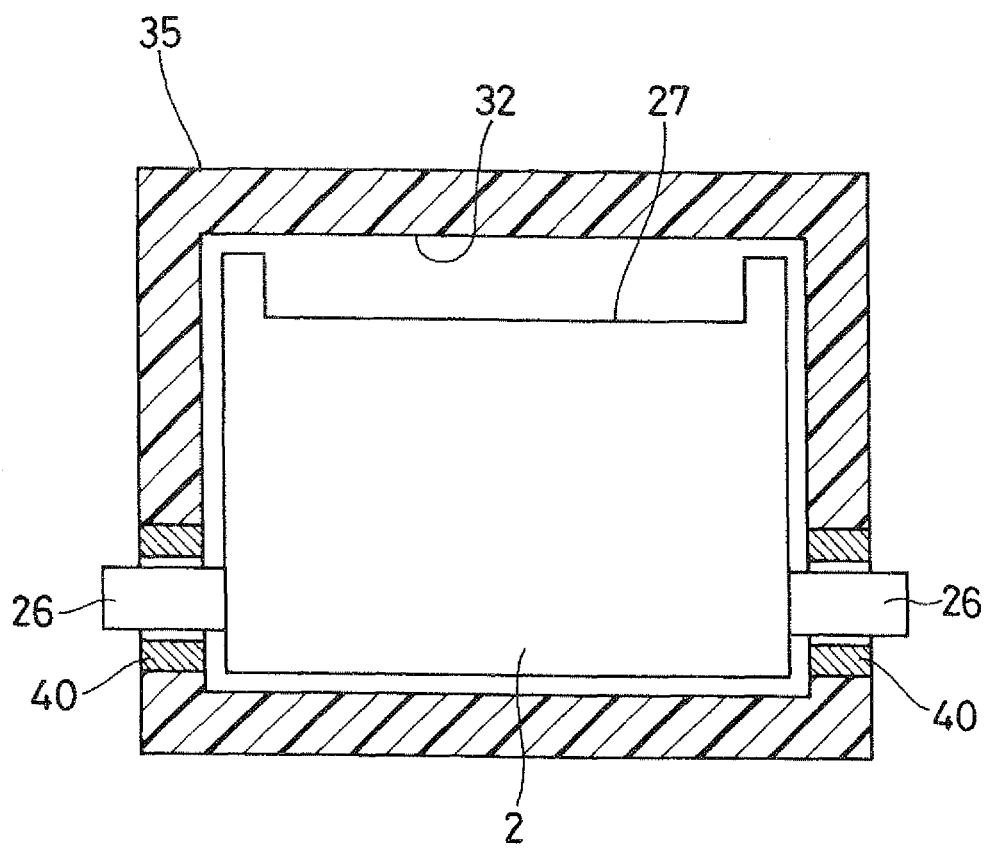
FIG. 3 is a cross-sectional view showing a valve unit or cartridge according to the first embodiment.
Figure 4:
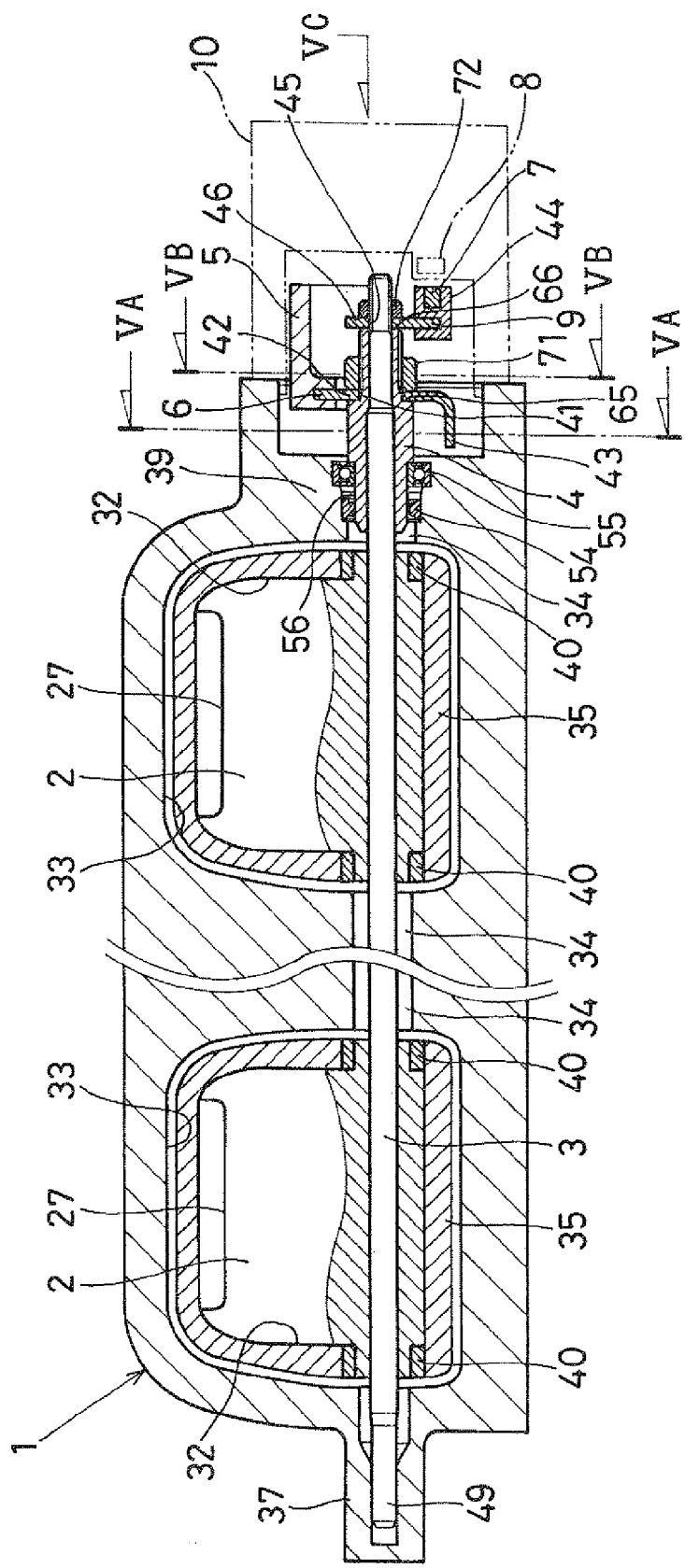
FIG. 4 is a cross-sectional view showing an intake vortex generating device according to the first embodiment.

The actuator in the present embodiment includes, as shown in FIGS. 3 and 4, an electric motor (not shown) generating a driving force upon supply of power, a power transmission mechanism transmitting the driving force of the electric motor to the pin rod 3, an actuator body 10 housing the electric motor and the power transmission mechanism therein and the like. The power transmission mechanism is formed of a gear reduction mechanism which reduces a rotational speed of the electric motor to achieve a predetermined reduction ratio and increases the driving force (motor torque) of the electric motor. The gear reduction mechanism includes a motor gear fixed to a motor shaft of the electric motor, an intermediate reduction gear meshing with the motor gear and a final reduction gear 5 meshing with the intermediate reduction gear. The respective gears are rotatably accommodated in the actuator body 10, particularly the actuator case. Here, a spring may be assembled in the pin rod 3 or the final reduction gear 5 for urging all the intake flow control valves 2 in the valve-opening operation direction or the valve-closing operation direction.

The final reduction gear 5 is integrally formed in an arc shape by a resin material. The stopper lever (gear retaining member) 6 is insert-molded inside the final reduction gear 5, being selectively engaged by a fully opened stopper (fully opened stopper screw) or a fully closed stopper (fully closed stopper screw) supported and fixed in the intake manifold 1. The stopper lever 6 includes a first annular portion 42 in a circular ring shape inside which a first fitting bore 41 in an elliptic shape is formed and an arc-shaped bent portion 43 which is bent in a L-shape from an outer peripheral end of the first annular portion 42. The first fitting bore 41 has a width across flat portion. In consequence, the first annular portion 42 of the stopper lever 6 is fitted on an outer periphery of the joint 4 in such a manner as to be movable in a direction perpendicular to the rotational shaft direction of the joint 4 and not to be movable in the circumferential direction of the joint 4.

A fully opened stopper portion engaged to the fully opened stopper is provided in one side of a bent portion 43 of the stopper lever 6 in the rotational direction (valve-opening operation direction). As a result, when the fully opened stopper portion of the stopper lever 6 gets in contact with the fully opened stopper, the valve position of the TCV is regulated to be in a state of a fully opened opening degree (fully opened position). On the other hand, a fully closed stopper portion engaged to the fully closed stopper is provided in the other side of the bent portion 43 of the stopper lever 6 in the rotational direction (valve-closing operation direction). As a result, when the fully closed stopper portion of the stopper lever 6 gets in contact with the fully closed stopper, the valve position of the TCV is regulated to be in a state of a fully closed opening degree (fully closed position).

The electric motor driving the plurality of the intake flow control valves 2 through the pin rod 3 is constructed to be electrically controlled (driven) by the ECU. The ECU is provided with a microcomputer of a known structure including a CPU performing control processing and calculation processing, a memory device (memory such as ROM and RAM) storing control programs or control logic and various data, an input circuit (input portion), an output circuit (output portion), a power source circuit, a timer and the like. When an ignition switch turns on, the ECU is constructed to drive the electric motor of the throttle controller and the electric motor of the intake vortex generating device, and also the fuel injection device (electric fuel pump, injector 12 and the like) and an ignition device (ignition coil, spark plug 13 and the like), based upon the control programs or the control logic stored in the memory. In consequence, the intake air quantity, the valve position of the TCV, the fuel injection quantity and the like are respectively controlled to reach control command values (control target values).

When an ignition switch turns off, the ECU is constructed to forcibly terminate the engine control such as the fuel injection control and the ignition control based upon the control program or the control logic stored in the memory. The ECU is constructed in such a manner that sensor signals from various sensors such as the crank angle sensor, the accelerator position sensor, the throttle position sensor, the valve position sensor, the cooling water temperature sensor 15, the air flow meter 21 and the exhaust gas sensor 24 are A/D-converted by an A/D converter and thereafter, inputted to the microcomputer.

The valve position sensor is a rotational angle detecting device of a non-contact type which includes a magnet 7 fixed at the other end of the pin rod 3 in the rotational shaft direction and a hole element (sensor body) 8 forming a magnetic circuit together with the magnet 7. The rotational angle detecting device detects a rotational angle (valve position) of the plurality of the intake flow control valves 2 by using output change properties of the hole element 8 with respect to the rotational angle of the magnet 7. That is, the valve position sensor detects the valve position of the TCV based upon a magnetic flux detection gap formed between a pair of opposing division yokes (magnetic bodies), that is, a change of the magnetic flux density passing through the hole element 8.

The magnet 7 is a permanent magnet which continues to stably generate a magnetic force for a long period of time and is retained and is fixed by a clamping means such as an adhesive to a magnet rotor 44 rotating relatively to the actuator case and the hole element 8. The magnet rotor 44 retaining the magnet 7 is formed integrally with the magnet 7 by a resin material and insert-molds a sensor fixing lever (sensor retaining member) 9. The magnet 7 and the magnet rotor 44 retaining the magnet 7 are retained and fixed in the sensor fixing lever 9 fitted and retained in the other end of the pin rod 3 in the rotational shaft direction in such a manner as to rotate with rotation of the plurality of the intake flow control valves 2 and the pin rod 3 as detection objects. It should be noted that in place of the magnet 7, an electromagnet for generating a magnetic force upon supply of power may be used.

The hole element 8 constitutes a magnetic detection element of a non-contact type the output of which changes in accordance with the magnetic flux density (magnetic flux density chain-crossing the hole element 8) passing through the midst of the magnetic circuit that is, the magnetic flux detection gap formed between the pair of the opposing yokes. The hole element 8 is retained and fixed in the actuator body 10, particularly a sensor mounting portion of the actuator case. In place of the hole element 8, a hole IC or a magnetic resistance element may be used. The sensor fixing lever 9 has a second annular portion 46 in a circular ring shape inside which a second fitting bore 45 having an elliptic shape is formed. The second fitting bore 45 has a width across flat portion. In consequence, the second annular portion 46 of the sensor fixing level 9 is fitted on the outer periphery of the pin rod 3 in such a manner as to be movable in a direction perpendicular to the rotational shaft direction of the pin rod 3 and not to be movable in the circumferential direction of the pin rod 3.

Figure 5A:
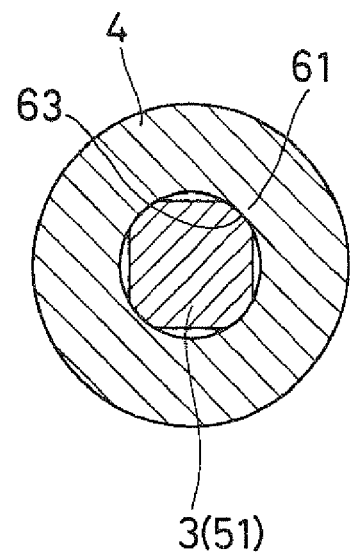
FIG. 5A is a cross-sectional view taken along a line VA-VA in FIG. 4 according to the first embodiment.
Figure 5B:
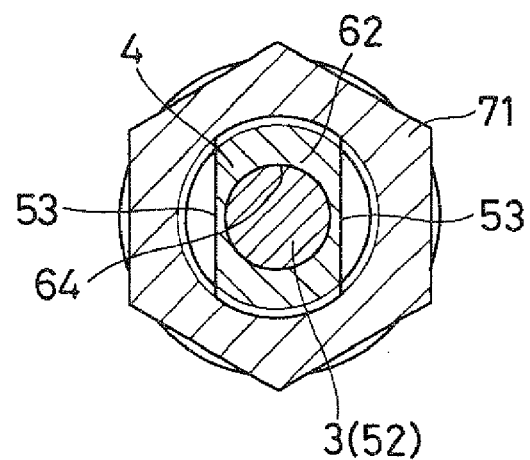
FIG. 5B is a cross-sectional view taken along a line VB-VB in FIG. 4 according to the first embodiment.
Figure 5C:
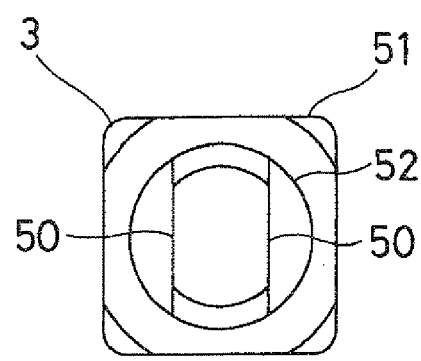
FIG. 5C is a front view showing a shaft viewed from a direction VC in FIG. 4 according to the first embodiment.

Next, a detail of the pin rod 3 in the present embodiment will be explained with reference to FIGS. 4 to 5C. A sliding portion 49 having a circular cross section perpendicular to the rotational shaft direction is, as shown in FIG. 4, formed at one end of the pin rod 3 in the rotational shaft direction. The sliding portion 49 is supported slidably in the rotational direction by the shaft bearing portion 37 of the intake manifold 1. A polygonal portion having a polygonal cross section (for example, square shape) perpendicular to the rotational shaft direction, a circular portion having a circular cross section perpendicular to the rotational shaft direction and an elliptic portion (engagement portion) having a width across flat portion 50 are, as shown FIGS. 4 to 5C, formed on the other end of the pin rod 3 in the rotational shaft direction. The pin rod 3 has a cross sectional area which gradually reduces in the order of the polygonal portion, the circular portion and the elliptic portion.

A part of the polygonal portion is provided with a first fitting portion 51 in a polygonal shape (for example, square shape) which is press-fitted and fixed in a first press-fit portion 61 of the joint 4. Each of four edge portions of the first fitting portion 51 has a chamfer in a circular shape. A part of the circular portion is provided with a second fitting portion 52 in a circular shape which is press-fitted and fixed in a second press-fit portion 62 of the joint 4. It should be noted that the first fitting portion 51 is designed to have a cross sectional area larger that that of the second fitting portion 52. The first fitting portion 51 is arranged in the pin rod 3, which is closer to the valve (intake passage) in the rotational shaft direction than the second fitting portion 52. An outer periphery screw portion meshing with a second nut member 72 is formed in the elliptic portion. The second annular portion 46 of the sensor fixing lever 9 is fitted in the joint side of the elliptic portion.

Next, a detail of the joint 4 in the present embodiment will be explained with reference to FIGS. 4 to 5C. The joint 4 is a component which is fitted and retained on the outer periphery of the pin rod 3 and connects the final reduction gear 5 of the actuator and the stopper lever 6 retaining and fixing the final reduction gear 5 to the pin rod 3. First and second cylindrical portions each having a cylindrical cross section perpendicular to the rotational shaft direction and an elliptic portion (engagement portion) having a width across flat portion 53 are formed in the joint 4.

The first cylindrical portion is arranged closer to the valve (intake passage) than the second cylindrical portion which has the maximum outer diameter in the joint 4. The first cylindrical portion (sliding portion) includes a cylindrical surface (sliding surface) 56 rotatably supported on the shaft bearing portion 39 of the intake manifold 1 through an oil seal 54 and a ball bearing 55 on the outer periphery of the first cylindrical portion. It should be noted that the ball bearing 55 is a bearing member interposed between the inner peripheral surface of the shaft bearing portion 39 of the intake manifold 1 and the cylindrical surface 56 of the first cylindrical portion in the joint 4. A cylindrical surface slidably supported in the casing may be formed on an outer periphery of the joint. Therefore, even if a cross sectional configuration of the rotational shaft is polygonal, since it is possible to rotatably support the joint with the casing, the valve and the rotational shaft can be rotatably accommodated inside the casing. The joint may be rotatably supported by a bearing. Therefore, the valve and the rotational shaft can be rotatably accommodated inside the casing.

The second cylindrical portion includes a first press-fit portion 61 in a cylindrical shape fitted and retained by press-fitting on the outer peripheral surface of the first fitting portion 51 of the pin rod 3 having a polygonal shape. A circular, first press-fit bore 63 is formed inside the first press-fit portion 61. The first fitting portion 51 of the pin rod 3 is press-fitted and fixed on the bore wall surface of the first press-fit bore 63. Therefore, the pin rod 3 is retained and fixed on the bore wall surface of the first press-fit bore 63 in the joint 4 by press-fitting. The joint may be provided with a cylindrical press-fit portion inside which a press-fit bore is formed and the rotational shaft may be provided with a polygonal fitting portion which is press-fitted into the press-fit portion. On this occasion, a clearance is formed between an inner peripheral surface of the press-fit portion (bore wall surface of the press-fit bore) and an outer peripheral surface of the fitting portion (particularly, flat surface). It should be noted that the first press-fit portion 61 is arranged closer to the valve (intake passage) in the rotational shaft direction in the joint 4 than the second press-fit portion 62. A cross sectional configuration of the joint may be made cylindrical. Therefore, even if a cross sectional configuration of the rotational shaft is polygonal, since it is possible to rotatably support the joint with a casing, the valve and the rotational shaft can be rotatably accommodated inside the casing.

The elliptic portion includes a second press-fit portion 62 in a cylindrical shape fitted and retained by press-fitting on the outer peripheral surface of the second fitting portion 52 of the pin rod 3 having a circular shape. A circular, second press-fit bore 64 is formed inside the second press-fit portion 62. The second fitting portion 52 of the pin rod 3 is press-fitted and fixed on the bore wall surface of the second press-fit bore 64. Therefore, the pin rod 3 is retained and fixed on the bore wall surface of the second press-fit bore 64 in the joint 4 by press-fitting. The joint may be provided with a cylindrical press-fit portion inside which a press-fit bore is formed and the rotational shaft may be provided with a cylindrical fitting portion which is press-fitted into the press-fit portion. On this occasion, a clearance formed between the inner peripheral surface of the press-fit portion (bore wall surface of the press-fit bore) and the outer peripheral surface of the fitting portion is air-tightly sealed. It should be noted that the outer periphery screw portion meshing with the first nut member 71 is formed in the elliptic portion.

Here, an elliptic, annular first step surface formed between the second cylindrical portion of the joint 4 and the elliptic portion having a cross sectional area and an outer diameter smaller than those of the second cylindrical portion is provided with an annular gear mounting seat 65. The annular gear mounting seat 65 mounts the final reduction gear 5 and the stopper lever 6 retaining the final reduction gear 5 in a state of sandwiching a first annular portion 42 between the first nut member 71 and the first step surface. In addition, an elliptic, annular second step surface formed between the elliptic portion of the joint 4 and an elliptic portion (elliptic portion of the pin rod 3) having a cross sectional area and an outer diameter smaller than those of the elliptic portion of the joint 4 is provided with an annular sensor mounting seat 66. The annular sensor mounting seat 66 mounts the magnet 7 and the sensor fixing lever 9 retaining the magnet 7 in a state of sandwiching a second annular portion 46 between the second nut member 72 and the second step surface. Further, the first annular portion 42 of the stopper lever 6 is fitted in the gear mounting seat side of the elliptic portion in the joint 4. It should be noted that the sensor mounting seat 66 is arranged separately from the gear mounting seat 65.

(Operation of First Embodiment)

Next, an operation of the intake flow control valve of the present embodiment will be briefly explained with reference to FIGS. 1 to 5C.

When the ignition switch turns on, the ECU electrically controls the electric motor driving the throttle valve 25 and also drives the fuel injection device (electric fuel pump, injector 12 and the like) and the ignition device (ignition coil, spark plug 13 and the like). In consequence, the engine starts to operate. On this occasion, when a specific cylinder of the engine changes from an exhaust stroke to an intake stroke where the intake valve 17 opens and the piston 20 goes down, as the piston 20 goes down, a vacuum pressure (pressure lower than an atmospheric pressure) in the combustion chamber of the corresponding cylinder becomes large, so that a mixture is suctioned into the combustion chamber from the opening intake port 16.

In addition, when the engine is in a warm state and requires a great quantity of intake air, that is, when the engine is at an intermediate or high speed rotational regions, or at an intermediate or high load regions, the ECU controls power supply to the electric motor driving the plurality of the intake flow control valves 2 (for example, energizes the electric motor). Then, the driving force of the electric motor is transmitted to the pinion gear, the intermediate reduction gear and the final reduction gear 5 of the gear reduction mechanism in that order, further to the pin rod 3 from the stopper lever 6 insert-molded in the inner peripheral portion of the final reduction gear 5 via the joint 4.

In consequence, the plurality of the intake flow control valves 2 connected together in a skewer state by the pin rod 3 are driven in the valve-opening operation direction by the driving force of the electric motor and therefore, are opened. Here, in the present embodiment, the fully opened stopper portion is provided in one side of the bent portion 43 of the stopper lever 6 in the rotational direction. Therefore, when the final reduction gear 5 is rotated in the valve-opening operation direction by using the driving force of the electric motor, the stopper lever 6 also rotates in the valve-opening operation direction. Then, when the fully opened stopper portion of the stopper lever 6 gets in contact with the fully opened stopper, the valve position of the TCV is regulated so as to be in a state of a fully opened opening degree (fully opened position) where the intake flow control valve 2 is opened at its fully opened position.

On this occasion, the intake flow flowing into the respective second intake passages 32 formed in the plurality of the respective housings 35 from the plurality of the first intake passages 31 in the intake manifold 1 in the engine via inlet ports of the respective housings 35 of the TCVs passes straight through the plurality of the second intake passages 32. Then, the intake flow is introduced into the intake ports 16 formed in the cylinder head of the engine from the outlet ports of the respective housings 35. The intake flow which has passed the intake port 16 is supplied to the combustion chamber from an intake valve port of the intake port 16. At this time, the longitudinal intake vortex (tumble flow) is not generated in the combustion chamber of each cylinder in the engine.

On the other hand, when the engine is in a cold state and requires a small quantity of intake air only, that is, when the engine is at engine startup or at idling, the ECU controls power supply to the electric motor driving the plurality of the intake flow control valves 2 (for example, energizes the electric motor). In consequence, the plurality of the intake flow control valves 2 are driven in the valve-closing operation direction by the driving force of the electric motor and therefore, are closed. Here, in the present embodiment, the fully closed stopper portion is provided in the other side of the bent portion 43 of the stopper lever 6 in the rotational direction. Therefore, when the final reduction gear 5 is rotated in the valve-closing operation direction by using the driving force of the electric motor, the stopper lever 6 also rotates in the valve-closing operation direction. Then, when the fully closed stopper portion of the stopper lever 6 gets in contact with the fully closed stopper, the valve position of the TCV is regulated so as to be in a state of a fully closed opening degree (fully closed position) where the control valve 2 is closed at its fully closed position.

On this occasion, almost all of the intake flow flowing into the respective second intake passages 32 from the plurality of the first intake passages 31 in the intake manifold 1 in the engine via inlet ports of the respective housings 35 passes through a clearance (opening 27) between a passage wall surface of the housing upper wall portion of the housing 35 and the valve upper end surface of the intake flow control valve 2. Then, the intake flow introduced into the upper layer portion of the intake port 16 from each of the outlet ports of the plurality of the housings 35 flows along the ceiling wall surface of the upper layer portion of the intake port 16. Further, the intake flow which has flown along the ceiling wall surface of the upper layer portion of the intake port 16 is supplied to the combustion chamber from the intake valve port of the intake port 16. At this time, since the tumble flow is generated in the combustion chamber of each cylinder in the engine, the combustion efficiency improves in the combustion chamber at engine startup or at engine idling to improve the fuel consumption or exhaust gas emission (for example, HC reduction effect).

(Feature of First Embodiment)

As described above, in the intake controller (intake vortex generating device) for the internal combustion engine in the present embodiment, the joint 4 connecting the final reduction gear 5 and the stopper lever 6 to the pin rod 3 is fitted and retained on the end outer periphery of the actuator side of the pin rod 3 changing the valve positions of the plurality of the TCVs together in the rotational shaft direction. Concretely, the pin rod 3 in a polygonal shape penetrates through and is inserted in the polygonal holes formed in the valve shafts 26 of the plurality of the intake flow control valves 2 and thereby, is press-fitted and fixed on the inner peripheral surface of the valve shaft 26 of each of the plurality of the intake flow control valves 2. In consequence, the plurality of the intake flow control valves 2 are assembled on the outer periphery of the intermediate portion of the pin rod 3 in the rotational shaft direction.

Next, the cylindrical joint 4 is fitted on the outer periphery of the actuator side-end portion of the pin rod 3 in the rotational shaft direction. At this time, respective dimensional relations between, an outer diameter of the first fitting portion 51 of the pin rod 3 having a polygonal shape and an outer diameter of the second fitting portion 52 in a circular shape having a cross sectional area smaller than that of the first fitting portion 51, and an inner diameter of the first press-fit portion 61 of the joint 4 having a cylindrical shape and an inner diameter of the second press-fit portion 62 in a cylindrical shape having a cross sectional area smaller than that of the first press-fit portion 61, are set to have a press-fit dimensional relation. In consequence, the first and second fitting portions 51 and 52 of the pin rod 3 are press-fitted and fixed in the first and second press-fit portions 61 and 62 of the joint 4. Therefore, the joint 4 is securely fitted and retained on the outer periphery of the actuator side-end portion of the pin rod 3 in the rotational shaft direction. An assembly operation of the joint 4 to the pin rod 3 may be carried out after gear components (final reduction gear 5 and stopper lever 6) are assembled in the joint 4. In this case, in a state where the fully opened stopper portion (or fully closed stopper portion) of the stopper lever 6 is made to be in contact with the fully opened stopper (or fully closed portion) of the intake manifold 1, the assembly operation of the joint 4 to the pin rod 3 may be carried out.

The joint 4 fitted and retained on the outer periphery of the pin rod 3 is provided with the annular gear mounting seat 65 for mounting the final reduction gear 5 and the stopper lever 6 and the annular sensor mounting seat 66 for mounting the magnet 7, the magnet rotor 44 and the sensor fixing lever 9. The gear mounting seat 65 of the joint 4 is arranged separately from the sensor mounting seat 66. In consequence, the gear components (final reduction gear 5 and the stopper lever 6) and the sensor components (magnet 7, magnet rotor 44 and sensor fixing lever 9) are separately arranged from each other at the actuator side-end portion of the pin rod 3 as a shaft having a polygonal section in the rotational shaft direction.

More specially, the first annular portion 42 of the stopper lever 6 is fitted and retained on the outer periphery of the gear mounting seat side of the elliptic portion of the joint 4 in a state of being put between the gear mounting portion 65 of the joint 4 and the first nut member 71. The width across flat portion of the first fitting bore 41 formed in the first annular portion 42 of the stopper lever 6 is configured to correspond to the width across flat portion 53 of the elliptic portion of the joint 4. Accordingly, the stopper lever 6 is fitted and retained on the outer periphery of the gear mounting seat side of the elliptic portion of the joint 4 not to be movable in the circumferential direction of the joint 4. In consequence, the gear components (final reduction gear 5 and stopper lever 6) are mounted on the outer periphery of the gear mounting portion side of the elliptic portion of the joint 4. In addition, at least a relative rotational operation of the gear component to the joint 4 is restricted (or regulated).

In addition, the second annular portion 46 of the sensor fixing lever 9 is fitted and retained on the outer periphery of the joint side of the elliptic portion of the pin rod 3 in a state of being put between the sensor mounting seat 66 of the joint 4 and the second nut member 72. The width across flat portion of the second fitting bore 45 formed in the second annular portion 46 of the sensor fixing lever 9 is configured to correspond to the width across flat portion 50 of the elliptic portion of the pin rod 3. Accordingly, the sensor fixing lever 9 is fitted and retained on the outer periphery of the joint side of the elliptic portion of the pin rod 3 not to be movable in the circumferential direction of the pin rod 3. In consequence, the sensor components (magnet 7, magnet rotor 44 and sensor fixing lever 9) are mounted on the outer periphery of the joint side of the elliptic portion of the pin rod 3. In addition, at least a relative rotational operation of the sensor component to the pin rod 3 is restricted (or regulated).

As described above, in the intake vortex generating device for the internal combustion engine of the present embodiment, the gear components of the final reduction gear 5 and the stopper lever 6, and the sensor components of the magnet 7, the magnet rotor 44 and the sensor fixing lever 9 are fixed separately from each other on the outer periphery of the actuator side-end portion of the pin rod 3 changing the valve positions of the plurality of the TCVs together in the rotational shaft direction. That is, the joint 4 is fitted and retained on the outer periphery of the actuator side-end portion of the pin rod 3 in the rotational shaft direction and the gear components (final reduction gear 5 and stopper lever 6) are mounted on the outer periphery of the gear mounting seat side of the elliptic portion in the joint 4 and further, the sensor components (magnet 7, magnet rotor 44 and sensor fixing lever 9) are mounted on the outer periphery of the joint side of the elliptic portion in the pin rod 3. Therefore, the gear components and the sensor components respectively can be fixed in different components (pin rod 3 and joint 4) and thereby, the gear components and the sensor components are fixed separately from each other on the outer periphery of the actuator side-end portion of the pin rod 3 in the rotational shaft direction.

Thereby, in a state of making the fully opened stopper portion of the stopper lever 6 get in contact with the fully opened stopper of the intake manifold 1, that is, in a state of the valve position of the plurality of the TCVs being the fully opened opening degree, the output of the hole element 8 for detecting the magnetic flux emitted from the magnet 7 is measured. At this time, when there occurs a deviation between an output value of the fully opened opening degree which is set in advance and the present output value, it is possible to detect an abnormal state such as a rotational slip between the pin rod 3 and the gear components (final reduction gear 5 and stopper lever 6) by the valve position sensor having the magnet 7 rotating integrally with the pin rod 3. As a result, when a reference position for controlling the intake flow control valve 2 is corrected to the present output value, an accuracy of the valve position control can be improved. In addition, it is also possible to detect an abnormal state such as a rotational slip between the pin rod 3 and the joint 4 by the valve position sensor having the magnet 7 rotating integrally with the pin rod 3. A gear or a gear retaining member and a sensor or a sensor retaining member are separately fixed to a rotational shaft changing an opening of a valve. This allows an abnormal state such as a rotational slip between the rotational shaft and the gear to be detected with a magnetic detection element of a non-contact type (sensor body) for detecting magnetic flux emitted from a sensor component (for example, magnet, magnetic body (yoke) or the like) rotating integrally with the sensor, particularly the rotational shaft. In addition, it is possible to fix the gear or the gear retaining member and the sensor or the sensor retaining member to the different components. This allows an abnormal state such as a rotational slip between the rotational shaft and the joint to be detected with the magnetic detection element of a non-contact type (sensor body) for detecting magnetic flux emitted from the sensor component (for example, magnet, magnetic body (yoke) or the like) rotating integrally with the sensor, particularly the rotational shaft.

The first and second fitting portions 51 and 52 of the pin rod 3 in the present embodiment are retained and fixed by press-fitting on the bore wall surfaces of the respective first and second press-fit bores 63 and 64 of the first and second press-fit portions 61 and 62 of the cylindrical joint 4. Here, a cross sectional configuration of the first fitting portion 51 of the pin rod 3 is a polygonal one (square one) and a bore configuration of the first press-fit bore 63 in the joint 4 is a circular one corresponding to an outer diameter of the maximum outer diameter portion (edge portion) of the first fitting portion 51 (circular one in accordance with a press-fit dimensional relation with the first fitting portion 51). As well, a cross sectional configuration of the second fitting portion 52 of the pin rod 3 is a circular one and a bore configuration of the second press-fit bore 64 in the joint 4 is also a circular one corresponding to an outer diameter of the second fitting portion 52 (circular one in accordance with a press-fit dimensional relation to the second fitting portion 52).

In consequence, the intake air is leaked out from the second intake passage 32 formed inside the intake manifold 1 through a clearance formed between the valve bearing portion or the bearing 40 of the housing 35 and the valve shaft 26 of the intake flow control valve 2, the shaft through bore 34 of the intake manifold 1 and further, a clearance formed between the outer peripheral surface (particularly, flat surface) of the first fitting portion 51 of the pin rod 3 and the inner peripheral surface (bore wall surface of the first press-fit bore 63) of the first press-fit portion 61 in the joint 4. Even in this case, the air-tightness is secured between the outer peripheral surface of the second fitting portion 52 of the pin rod 3 and the inner peripheral surface (bore wall surface of the second press-fit bore 64) of the second press-fit portion 62 in the joint 4 (by a cylindrical seal portion). Therefore, the intake air is not leaked out from the second intake passage 32 to an outside of the intake manifold 1.

Further, the bore diameter of the first press-fit portion 61 in the joint 4 is set larger than that of the second press-fit bore 62 and a cross sectional area of the first fitting portion 51 of the pin rod 3 is set larger than that of the second fitting portion 52. Therefore, the torsional torque applied to the pin rod 3 through the intake flow control valve 2 due to a pressure of the intake air flowing in the first and second intake passages 31 and 32 is received at the first fitting portion 51 having the cross sectional area larger than that of the second fitting portion 52. In consequence, it is possible to alleviate the stress concentration in the second fitting portion 52 having the cross sectional area smaller than that of the first fitting portion 51. This causes durability of the pin rod 3 to be improved.

Second Embodiment

Figure 6A:
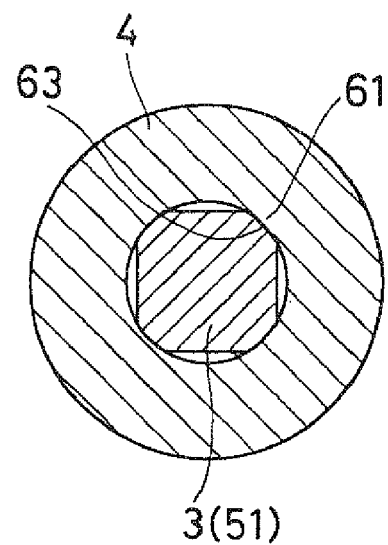
FIG. 6A is a cross-sectional view taken along the line VA-VA in FIG. 4 according to a second embodiment of the present invention.
Figure 6B:
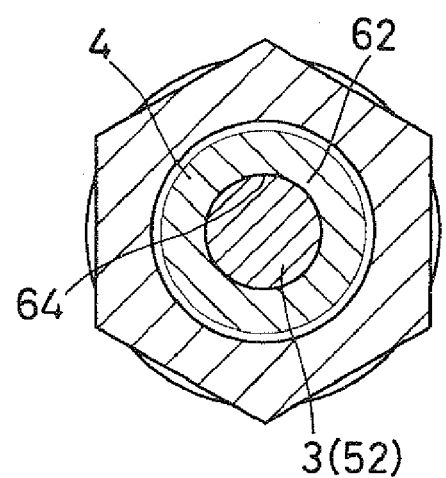
FIG. 6B is a cross-sectional view taken along the line VB-VB in FIG. 4 according to the second embodiment.
Figure 6C:
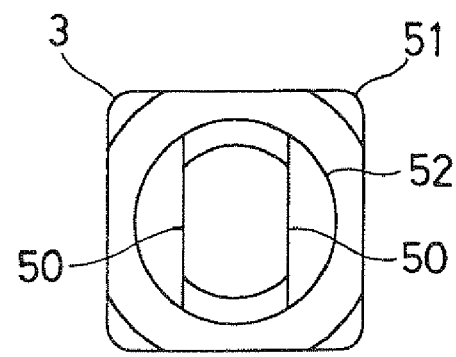
FIG. 6C is a front view showing a shaft viewed from the direction VC in FIG. 4 according to the second embodiment.
Figure 7:
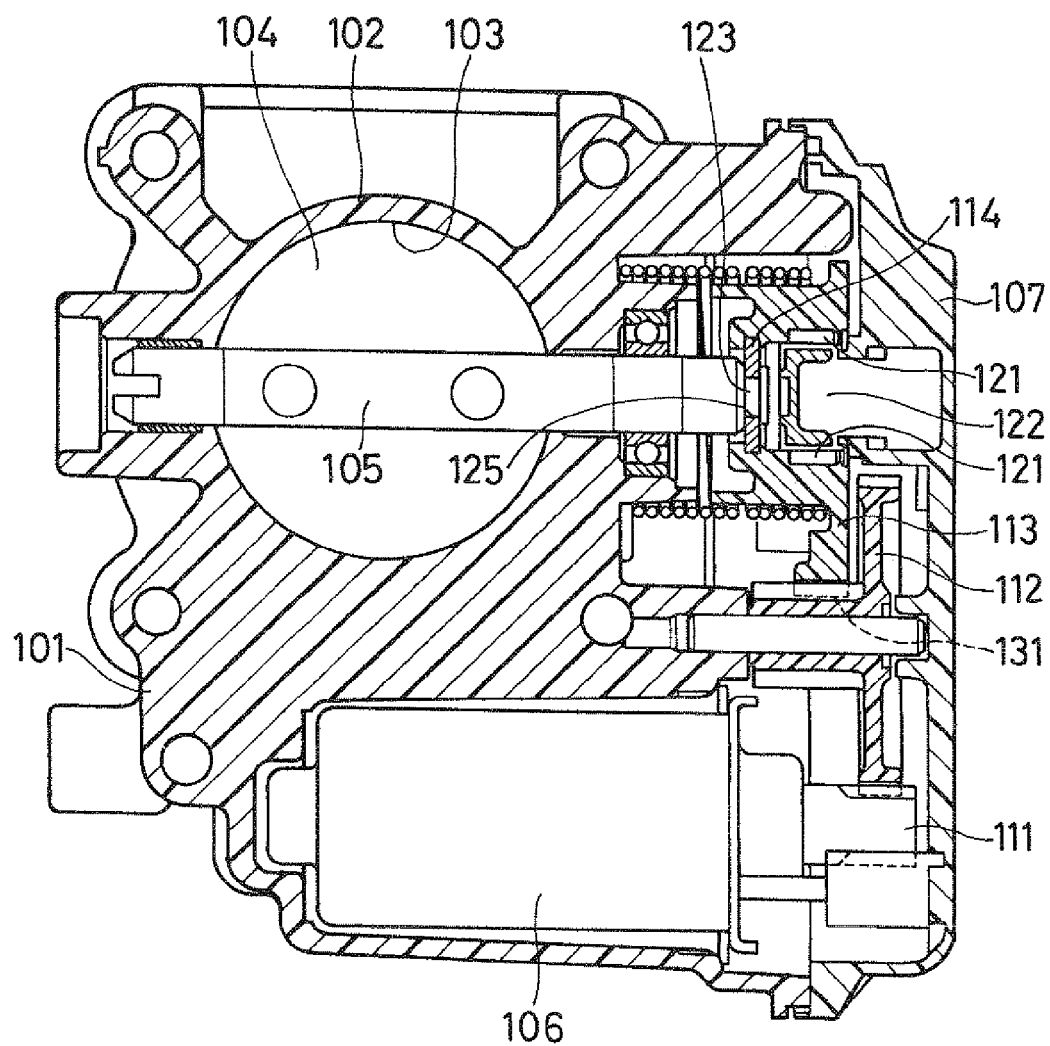
FIG. 7 is a cross-sectional view showing a previously proposed throttle controller for an internal combustion engine.
Figure 8:
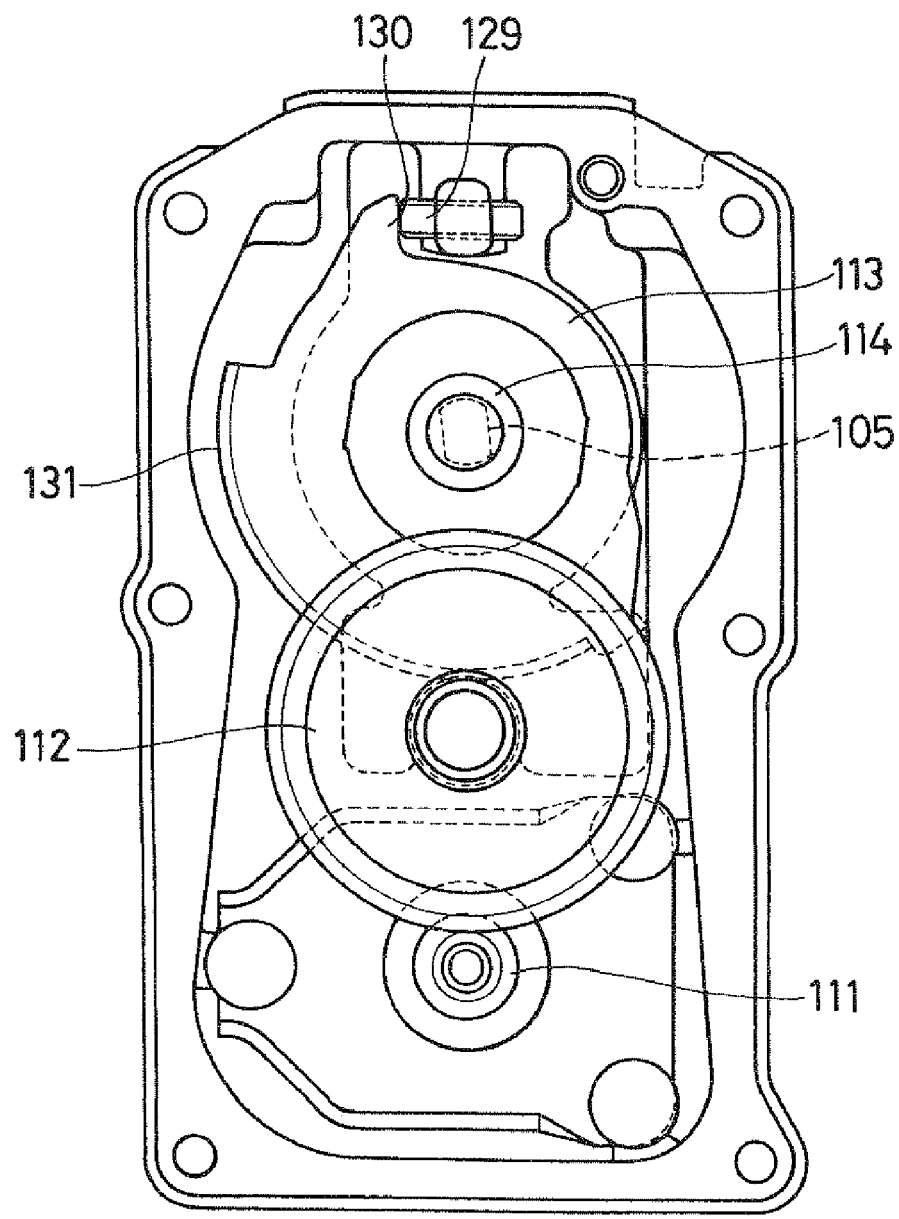
FIG. 8 is a side view showing a previously proposed actuator.
Figure 9:
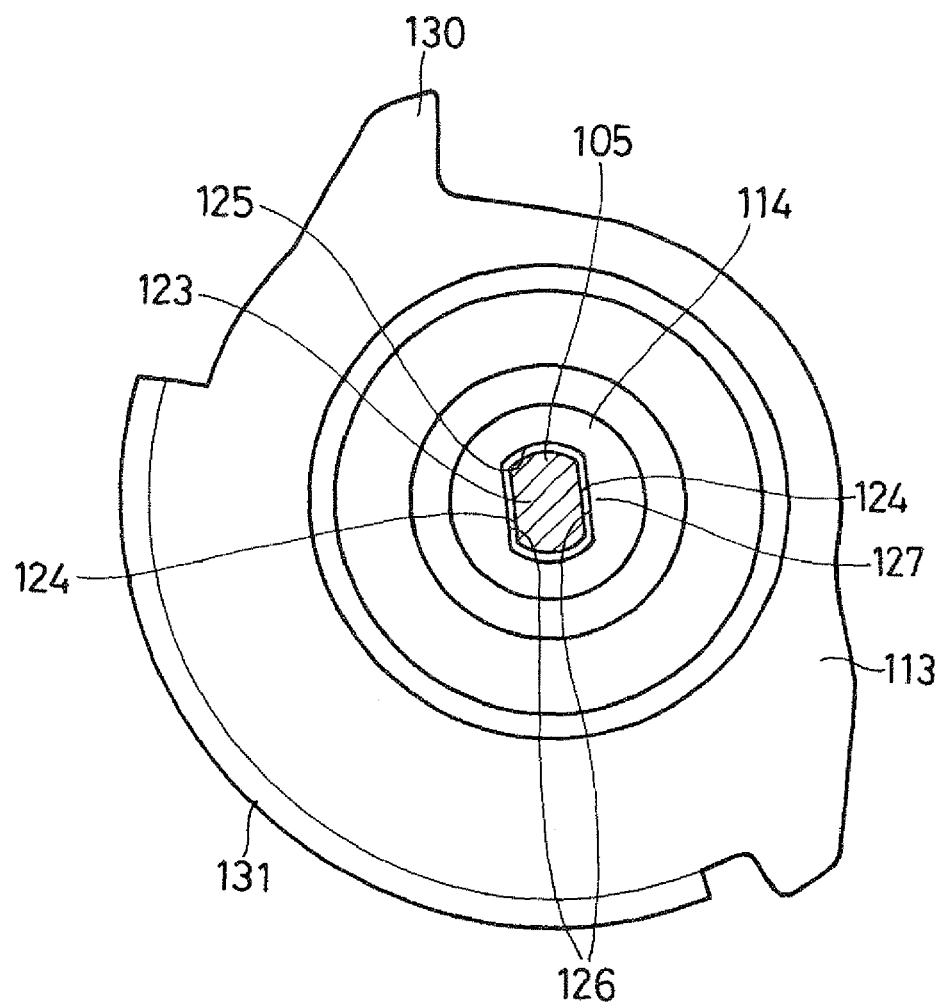
FIG. 9 is a front view showing a previously proposed final reduction gear.
Figure 10:
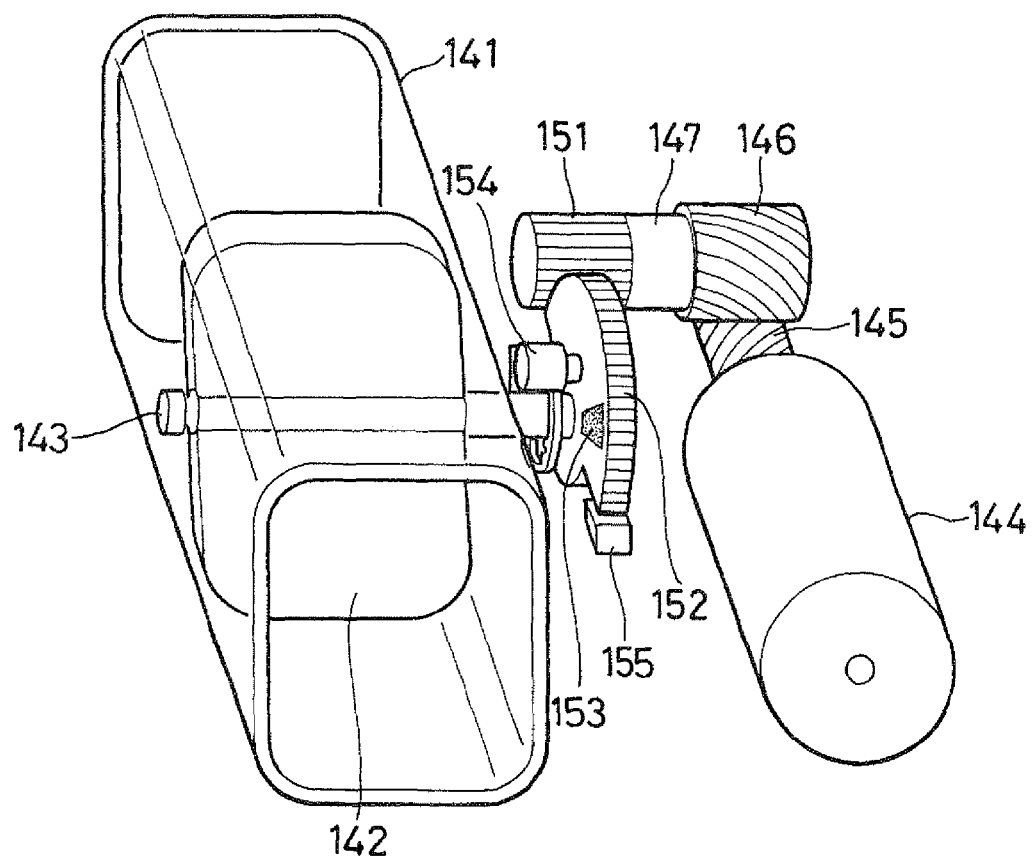
FIG. 10 is a schematic diagram showing a previously proposed intake passage opening/closing device for an internal combustion engine.
Figure 11:
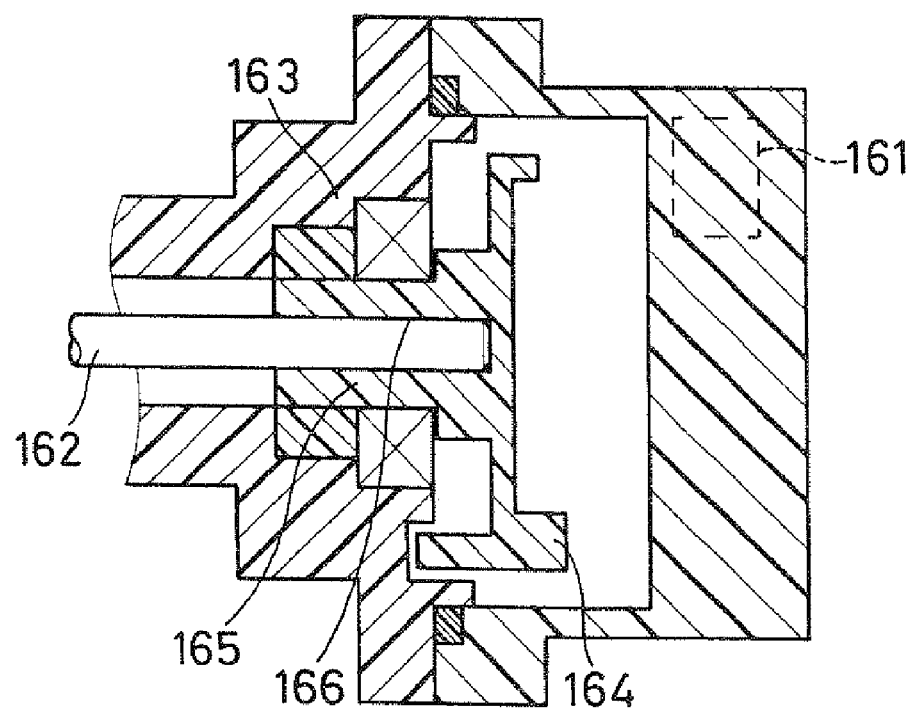
FIG. 11 is a cross-sectional view showing a previously proposed intake controller for an internal combustion engine.

A second embodiment of the present invention will be explained with reference to FIGS. 6A to 6C.

The second fitting portion 52 of the pin rod 3 in the present embodiment is retained and fixed on the bore wall surface of the second press-fit bore 64 of the cylindrical, second press-fit portion 62 in the joint 4 by press-fitting. That is, since the second press-fit portion 62 does not have the width across flat portion 53, it is possible to make the cross sectional area of the second press-fit portion 62 larger as compared to the first embodiment. In consequence, it is possible to improve durability of the second press-fit portion 62 in the joint 4. It should be noted that the gear mounting seat 65 of the joint 4 is partially provided with projections having an approximate size of the plate thickness of the stopper lever 6 and the contact surface (opposing surface opposed to the gear mounting seat 65) of the first annular portion 42 of the stopper lever 6 is partially provided with engagement grooves (or engagement bores) engaging with the projections of the joint 4. Accordingly, even in a case of forming the bore configuration of the first fitting bore 41 of the stopper lever 6 to be in a circular shape, the first annular portion 42 of the stopper lever 6 is fitted and retained on the outer periphery of the gear mounting seat side of the elliptic portion of the joint 4 not to be movable in the circumferential direction of the joint 4.

Modifications

In the present embodiment, the intake vortex generating device is constructed to be capable of generating the longitudinal intake vortex (tumble flow) for promoting combustion of a mixture in the combustion chamber of each cylinder in the engine, but the intake vortex generating device may be constructed to be capable of generating a lateral intake vortex (swirl flow) for promoting combustion of a mixture in the combustion chamber of each cylinder in the engine. Further, the intake vortex generating device may be constructed to be capable of generating a squish vortex for promoting combustion of the engine.

In the present embodiment, the present invention is applied to an intake vortex generating device for an internal combustion engine, but the present invention may be applied to a throttle controller or an intake variable device changing a passage length or a passage cross sectional area of an intake passage for an internal combustion engine. In the present embodiment, the actuator driving the valve shaft 26 of the intake flow control valve 2 is formed of the electric motor and the power transmission mechanism (for example, gear reduction mechanism), but the actuator driving the shaft of the valve may be formed of the motor only. It should be noted that a valve urging means such as a spring for urging the valve in the valve-opening operation direction or in the valve-closing operation direction may be or may not be provided.

In place of the TCV (tumble flow control valve) in the present embodiment which is the intake control valve including the valve arranged in an intake passage formed inside the casing such as the intake pipe or the intake manifold 1 to control intake air suctioned into the combustion chamber for the internal combustion engine, an intake flow quantity control valve including the throttle valve 25 arranged in an intake passage formed inside a throttle body to control intake air suctioned into the combustion chamber for the internal combustion chamber, or an intake flow quantity control valve including an idle rotational speed control valve arranged in the intake passage formed inside the housing to control a flow quantity of an intake air bypassing the throttle valve 25 may be used.

Further, as the intake control valve formed of the casing (or housing) and the intake flow control valve, an intake passage opening/closing valve, an intake passage switching valve or an intake pressure control valve may be used in place of the intake flow control valve or the intake flow quantity control valve. In addition, the intake control valve may be applied to an intake flow control valve such as the tumble flow control valve in the first embodiment or the swirl flow control valve or an intake variable valve changing a passage length or a passage cross sectional area of the intake passage for the internal combustion engine. A diesel engine may be used as the internal combustion engine. Further, not only the multi-cylinder engine but also a single-cylinder engine may be used as the internal combustion engine.

The present embodiment adopts an integrated multiple valve opening/closing device (intake passage opening/closing device) where a plurality of valve units are arranged at constant intervals in the rotational shaft direction of the pin rod 3 inside the intake manifold 1 as the casing, each valve unit (cartridge) assembling one intake flow control valve 2 inside one housing 35 so as to open or close therein. However, there may be adopted an integrated multiple valve opening/closing device (intake passage opening/closing device) where a plurality of valves are directly arranged at constant intervals in the rotational shaft direction of the shaft inside the casing (other intake pipe, engine head cover or cylinder head). In this case, the housing 35 becomes unnecessary. In addition, the valve driven by the actuator (particularly gear) formed of the electric motor, the power transmission mechanism (gear reduction mechanism) and the like is not limited to the integrated multiple intake control valve, but if the valve is arranged in the intake passage for the internal combustion engine, one intake control valve may be used.

Additional advantages and modifications will readily occur to those skilled in the art. The invention in its broader terms is therefore not limited to the specific details, representative apparatus, and illustrative examples shown and described.

What is claimed is:

1. An intake controller for an internal combustion engine comprising:
    a casing defining an intake passage, which communicates with a combustion chamber of the engine;
    a valve that is received in the casing to open and close the intake passage;
    a rotational shaft configured to change a degree of opening of the valve;
    an actuator having a gear, which is disposed to drive the valve through the rotational shaft;
    a gear retaining member arranged to retain the gear;
    a sensor including:
        a magnet disposed to rotate in accordance with rotation of the rotational shaft; and
        a magnetic detection element configured to detect a magnetic flux generated from the magnet, wherein the sensor is configured to detect the degree of opening of the valve based on a change of a density of the magnetic flux passing through the magnetic detection element;
    a sensor retaining member arranged to retain the sensor, wherein one of the gear and the gear retaining member, and one of the sensor and the sensor retaining member are separately fixed on the rotational shaft;
    a joint fitted on an outer periphery of the rotational shaft, wherein the one of the gear and the gear retaining member and the rotational shaft are joined by the joint; and
    a bearing between the casing and the joint, wherein the casing includes a bearing portion, which rotatably supports the joint through the bearing, and the joint has a cylindrical cross-sectional surface perpendicular to an axial direction of the joint.

2. The intake controller according to claim 1, wherein the rotational shaft has a polygonal cross-sectional surface perpendicular to an axial direction of the rotational shaft.

3. The intake controller according to claim 1, wherein an outer periphery of the joint has a cylindrical surface, which is slidably supported by the casing.

4. The intake controller according to claim 3, further comprising a bearing between the casing and the joint, wherein the casing includes a bearing portion, which rotatably supports the joint through the bearing.

5. The intake controller according to claim 1, wherein:
    the joint includes a press-fit bore, into which the rotational shaft is inserted such that the rotational shaft penetrates through the press-fit bore in the axial direction of the rotational shaft; and
    the rotational shaft is retained and fixed on a bore wall surface of the press-fit bore by press-fitting.

6. The intake controller according to claim 5, wherein:
the joint includes a press-fit portion having a cylindrical cross-sectional surface perpendicular to an axial direction of the joint and having the press-fit bore therein; and
the rotational shaft includes a fitting portion, which has a polygonal cross-sectional surface perpendicular to the axial direction of the rotational shaft and is press-fitted and fixed in the press-fit portion.

7. The intake controller according to claim 5, wherein:
the joint includes a press-fit portion having a cylindrical cross-sectional surface perpendicular to an axial direction of the joint and having the press-fit bore therein; and
the rotational shaft includes a fitting portion, which has a circular cross-sectional surface perpendicular to the axial direction of the rotational shaft and is press-fitted and fixed in the press-fit portion.

8. The intake controller according to claim 5, wherein:
the joint includes a first press-fit portion and a second press-fit portion, each of which has a cylindrical cross-sectional surface perpendicular to an axial direction of the joint and has the press-fit bore therein; and
the rotational shaft includes:
    a first fitting portion, which has a polygonal cross-sectional surface perpendicular to the axial direction of the rotational shaft and is press-fitted and fixed in the first press-fit portion; and
    a second fitting portion, which has a circular cross-sectional surface perpendicular to the axial direction of the rotational shaft and is press-fitted and fixed in the second press-fit portion.

9. The intake controller according to claim 8, wherein:
a bore diameter of the first press-fit portion is larger than a bore diameter of the second press-fit portion; and
a cross sectional area of the first fitting portion is larger than a cross sectional area of the second fitting portion.

10. The intake controller according to claim 1, wherein:
the joint includes an annular gear mounting seat, on which the one of the gear and the gear retaining member is attached, and an annular sensor mounting seat, on which the one of the sensor and the sensor retaining member is attached; and
the sensor mounting seat is arranged separately from the gear mounting seat.

11. The intake controller according to claim 1, wherein:
the one of the gear and the gear retaining member includes an annular portion, which has therein a fitting bore formed in an elliptic shape; and
the annular portion is fitted on an outer periphery of the joint so as not to be displaced in a circumferential direction of the joint.

12. The intake controller according to claim 1, wherein:
the one of the sensor and the sensor retaining member has an annular portion, which has therein a fitting bore formed in an elliptic shape; and
the annular portion is fitted on an outer periphery of the rotational shaft so as not to be displaced in a circumferential direction of the rotational shaft.

13. An intake controller for an internal combustion engine comprising:
a casing defining an intake passage, which communicates with a combustion chamber of the engine;
a valve that is received in the casing to open and close the intake passage;
a rotational shaft configured to change a degree of opening of the valve;
an actuator having a gear, which is disposed to drive the valve through the rotational shaft;
a gear retaining member arranged to retain the gear;
a sensor including:
    a magnet disposed to rotate in accordance with rotation of the rotational shaft; and
    a magnetic detection element configured to detect a magnetic flux generated from the magnet, wherein the sensor is configured to detect the degree of opening of the valve based on a change of a density of the magnetic flux passing through the magnetic detection element;
a sensor retaining member arranged to retain the sensor, wherein one of the gear and the gear retaining member, and one of the sensor and the sensor retaining member are separately fixed on the rotational shaft;
a joint fitted on an outer periphery of the rotational shaft, wherein the one of the gear and the gear retaining member and the rotational shaft are joined by the joint; and
a bearing between the casing and the joint, wherein the casing includes a bearing portion, which rotatably supports the joint through the bearing, and an outer periphery of the joint has a cylindrical surface, which is slidably supported by the casing.

14. An intake controller for an internal combustion engine comprising:
a casing defining an intake passage, which communicates with a combustion chamber of the engine;
a valve that is received in the casing to open and close the intake passage;
a rotational shaft configured to change a degree of opening of the valve;
an actuator having a gear, which is disposed to drive the valve through the rotational shaft;
a gear retaining member arranged to retain the gear;
a sensor including:
    a magnet disposed to rotate in accordance with rotation of the rotational shaft; and
    a magnetic detection element configured to detect a magnetic flux generated from the magnet, wherein the sensor is configured to detect the degree of opening of the valve based on a change of a density of the magnetic flux passing through the magnetic detection element;
a sensor retaining member arranged to retain the sensor, wherein one of the gear and the gear retaining member, and one of the sensor and the sensor retaining member are separately fixed on the rotational shaft; and
a joint fitted on an outer periphery of the rotational shaft, wherein the one of the gear and the gear retaining member and the rotational shaft are joined by the joint, wherein:
the joint includes a press-fit bore, into which the rotational shaft is inserted such that the rotational shaft penetrates through the press-fit bore in the axial direction of the rotational shaft;
the rotational shaft is retained and fixed on a bore wall surface of the press-fit bore by press-fitting;
the joint includes a first press-fit portion and a second press-fit portion, each of which has a cylindrical cross-sectional surface perpendicular to an axial direction of the joint and has the press-fit bore therein; and the rotational shaft includes:
- a first fitting portion, which has a polygonal cross-sectional surface perpendicular to the axial direction of the rotational shaft and is press-fitted and fixed in the first press-fit portion; and
- a second fitting portion, which has a circular cross-sectional surface perpendicular to the axial direction of the rotational shaft and is press-fitted and fixed in the second press-fit portion.

15. The intake controller according to claim 12, wherein:

a bore diameter of the first press-fit portion is larger than a bore diameter of the second press-fit portion; and a cross sectional area of the first fitting portion is larger than a cross sectional area of the second fitting portion.

* * * * *